United States Patent

Blackerby

[11] 3,785,447
[45] Jan. 15, 1974

[54] WEIGHING DEVICE FOR MOVABLE CONVEYORS

[76] Inventor: Alfred A. Blackerby, 11 Mark Dr., San Rafael, Calif. 94903

[22] Filed: Mar. 17, 1972

[21] Appl. No.: 235,840

Related U.S. Application Data

[60] Division of Ser. No. 92,891, Nov. 21, 1971, Pat. No. 3,659,194, which is a continuation-in-part of Ser. No. 799,322, Jan. 27, 1967, abandoned.

[52] U.S. Cl. .................. 177/119, 177/210, 198/39
[51] Int. Cl. .................... G01g 3/15, G01g 13/02
[58] Field of Search ............... 177/16, 119–121, 177/210; 198/39

[56] References Cited
UNITED STATES PATENTS

| 3,643,753 | 2/1972 | Godwin et al. | 177/210 X |
| 3,656,337 | 4/1972 | McDonald | 177/119 X |
| 3,561,553 | 2/1971 | Blubaugh | 177/16 X |

Primary Examiner—Richard B. Wilkinson
Assistant Examiner—Stanley J. Witkowski
Attorney—B. Deon Criddle

[57] ABSTRACT

A weighing device used an eddy current sensing device wherein lines of flux are passed in one direction through a stainless steel membrane. The membrane is specially heat treated such that it collimates and permits passage of generated lines of flux yet provides an effective environmental shield that will allow operation even when the device is subjected to temperatures of up to 1,400°F. and pressures of up to 3,000 p.s.i. An impedance comparator circuit, including measuring and reference coils having virtually identical characteristics, is used to operate a meter to thereby indicate proximity and/or characteristics of conductive materials spaced along the undersurface of an endless conveyor belt. The magnetic flux of the measuring coil is shielded and collimated to provide localized sensing and reflected impedance variations between the two coils, which comprise legs of a bridge circuit, are detected and translated to weighing measurements, as represented by the output signal of the sensing device.

7 Claims, 6 Drawing Figures

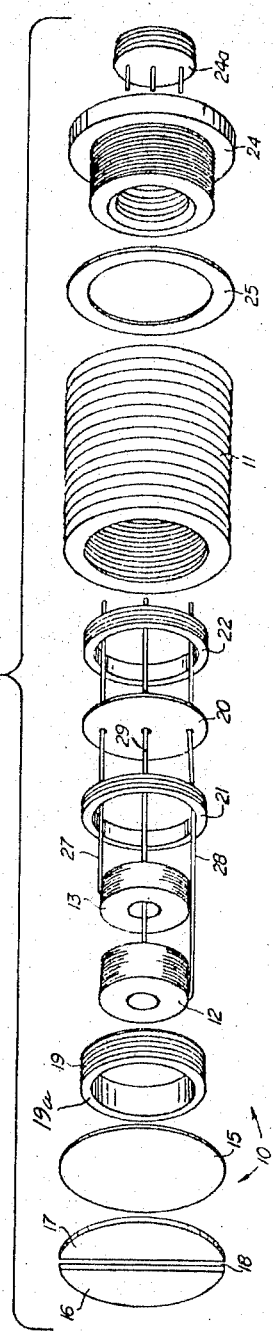
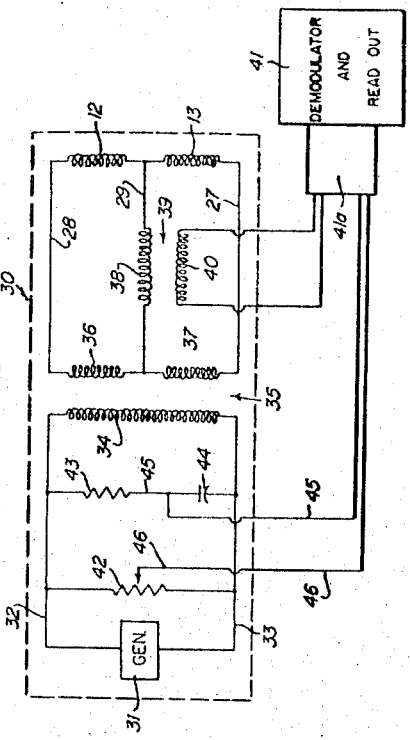

WEIGHING DEVICE FOR MOVABLE CONVEYORS

This application is a division of application Ser. No. 92,891, filed Nov. 21, 1971 now U.S. Pat. No. 3,659,194, which is a continuation-in-part of application Ser. No. 799,322, filed on Jan. 27, 1967, now abandoned.

BRIEF DESCRIPTION

There has long been a realization that eddy current readings, caused by changes in the lines of flux of an eddy current generator, are indicative of characteristics of a conductive material intercepting the lines of flux. However, because of the many other factors affecting such readings this method of determining such characteristics has not been widely used in the past. Temperatures and pressure variations and the variations caused by other proximate conductive materials and of nearby electrical circuits, for example, can cause such eddy current readings to be quite unreliable. Also, the conductive material being sensed will, itself re-radiate lines of flux and these have, in the past, caused erroneous readings in sensing devices relying upon flux changes for sensing purposes.

It is an object of the present invention to provide a highly reliable sensing device utilizing impedance changes resulting from interception by conductive material of the lines of flux of an eddy current generator that is not subject to significant error introduced from outside extraneous sources, re-radiated flux, and atmospheric conditions.

To accomplish this object, I have provided a sensing device that collimates the lines of flux produced by an eddy current generator to such an extent that they are only varied by the presence or nature of a conductive material coming within a small sensing area. The sensing device also prevents reverse passage of eddy currents to a bridge comparator circuit including matched impedance coils that provide compensation in the circuit for a wide range of ambient temperature changes or for effects other than those created by the interception of the collimated lines of flux.

Another object is to provide a weighing system using a sensing head of the invention to give instantaneous read-out of loads carried by an endless conveyor.

Principal features of the invention include the comparator circuit wherein flux variations of a measuring coil in one leg of an impedance bridge circuit are detected as deviations from a normal flux generated by an identical reference coil in the other leg of the bridge circuit; a stainless steel membrane that has been heat treated such that flux lines from the test coil will pass centrally through in one direction and, if desired, slightly spaced apart, non-ferrous shield members covering all of the stainless steel membrane except for that portion between them which defines a collimating slot. Both the heat treated membrane and the shield members, in addition to collimating lines of flux generated internally by the circuit used, prevent reverse passage of flux to such an extent that re-radiated flux or flux generated from adjacent bodies will not significantly affect readings obtained.

Other features include the use of vibration compensating springs and of the sensing device of the invention to measure proximity of conductive members spaced along the undersurface of an endless conveyor belt, the proximity of each conductive member with respect to said sensing device generating a signal that is converted to direct load read-out means.

Additional objects and features of the invention will become apparent from the following detailed description and drawings, disclosing what is presently contemplated as being the best mode of the invention.

THE DRAWINGS

FIG. 1 is an exploded perspective view of the sensing device of the invention;

FIG. 2, a longitudinal section through the assembled sensing device;

FIG. 3, a schematic circuit diagram showing the impedance comparator circuit of the invention;

FIG. 4, a fragmentary, perspective view, showing an endless conveyor with sensing devices arranged to provide continuous weighing of material carried by the conveyor;

FIG. 5, an enlarged fragmentary side elevation view of a portion of the conveyor and the mountings for the sensing devices; and FIG. 6, a vertical section taken on the line 6—6 of FIG. 5, and showing the circuit and read-out device for the sensing devices in schematic form.

DETAILED DESCRIPTION

Figure 4:
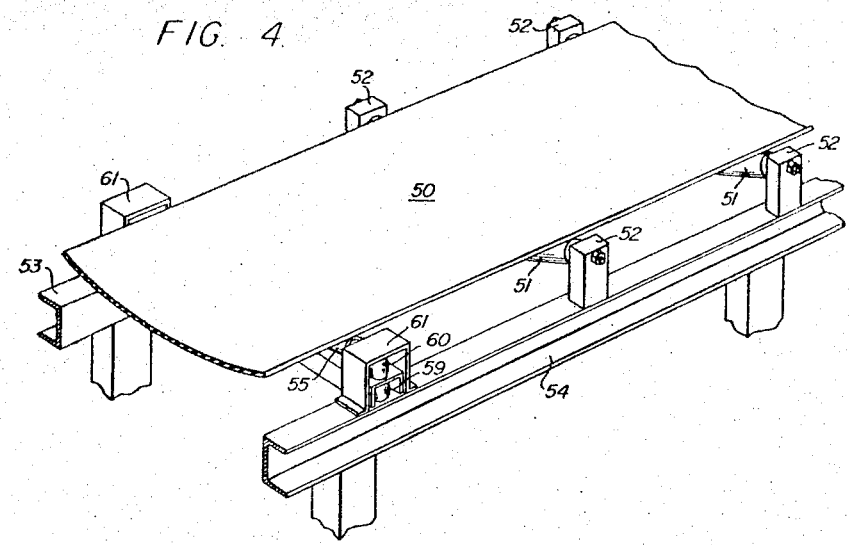

Referring now to the drawings:

As best seen in FIGS. 1 and 3, the sensing device, shown generally at 10, comprises a cylindrical housing 11 into which is fitted a measuring coil 12 and a reference coil 13. The forward end of the housing 11 has a specially treated, stainless steel non-magnetic end membrane 15 brazed thereover and a pair of non-ferrous, metallic, hemi-cyclic shield members 16 and 17 that are slightly spaced apart to form a slot 18 through which lines of flux will be collimated, as will be further explained.

A sleeve 19 is threaded into housing 11 until its end 19a is flush with the end of the housing. The sleeve 19 then provides additional backing support for the brazed-in-place membrane 15.

Another stainless steel non-magnetic membrane 20 is adapted to be positioned inside the housing and to extend thereacross. Membrane 20 is secured in place by rings 21 and 22, threaded into housing 11 at opposite sides of the membrane 20.

A plug of insulating material 23, FIG. 2, is positioned in housing 11 at the side of membrane 20 opposite the coils 12 and 13 and an internally threaded end cap 24 is threaded into the rear end of housing 11 to secure the plug 23 in place. A sealing gasket 25, of non-ferrous metal, is provided between the rear end of housing 11 and the head of cap 24. Ceramic potting material 26, around the coils 12 and 13 holds them in place inside the housing 11.

Lead wire 27, connected to one end of coil 13, lead wire 28, connected to one end of coil 12, and divider wire 29 connected to the other ends of the coils 12 and 13 are all passed through holes provided therefore in membrane 20, passages in the plug 23, and the central passageway in cap 24, to be connected into the circuit 30 shown best in FIG. 3. A seal plug 24a closes end cap 24 and has wires 24b passed therethrough to connect the wires 27, 28 and 29 into the circuit 30.

Circuit 30 includes an AC electrical generator 31 having output lines 32 and 33 connected to opposite ends of a primary winding 34 of a transformer 35.

Transformer 35 has a pair of identical secondary windings 36 and 37 and winding 36 is connected through lead wire 28 to be in series with the measuring coil 12 and to form one leg of a bridge circuit.

Divider wire 29 of the bridge circuit is connected between the windings 36 and 37 and has the primary winding 38 of another transformer 39 connected therein. The secondary winding 40 of the transformer 39 connected to a conventional demodulator and read-out device 41, whereby a reading will be provided or a control function will be performed in accordance with current changes through the primary winding 38, as compared with a phase-shifted reference current provided by a phase shifting circuit comprising a variable resistor 42 connected across the lines 32 and 33, and a series connected resistor 43 and filter capacitor 44. A line 45, connected at a point between resistor 43 and capacitor 44, and a line 46 connected to the variable tap of resistor 42,, complete the circuit to the demodulator and read-out device 41. The tap of the variable resistor 42 can be adjusted so that the read-out device will give a zero or null signal when the collimated lines of flux of the sensing device are not subjected to a conductive material being sensed. Thereafter, when the collimated lines of flux of the sensing device are subjected to such a conductive material, a reading indicative of the condutive material characteristics or proximity will be produced at the read-out device. Although many types of conventional demodulator and read-out devices can be used, a model AE–1, phase sensitive demodulator, manufactured by and available commercially from Alfred Adams Associates, Salt Lake City, Utah, has been found to be entirely suitable for many purposes. As is well known, such units include a switching unit 41a to permit shifting of the reference phase such that either the resistive component of the reflected impedance yields an output from the demodulator or the reactive component of the reflected impedance yields an output from the demodulator.

Since the measurement and reference coils 12 and 13 are identical in size, shape, windings, and electrical impedance, they will normally produce identical flux outputs. The membrane 20 is made of the same material as the membrane 15 and is essentially identical to insure that the flux patterns of the two coils remain virtually the same as they are evolved from the coils 12 and 13. The size of the flux pattern of coil 12 is thereafter reduced as it is collimated through membrane 15 and may be further collimated by directing it through the slot 18 between the highly conductive hemi-cyclic shield members 16 and 17, which are shown in FIG. 2 as being adhesively secured to the membrane 15, but which could as well be plated thereto, releasably clamped thereto or otherwise affixed. This may have some effect on the impedance readings of the circuit, but the current flow through divider wire 29 caused by the initial differential in impedance set up in the two coils is readily compensated by the positioning of the variable tap of resistor 42, so that a net comparative output reading of zero is obtained at the read-out device.

Temperature changes will affect both coils 12 and 13 in the same manner and the resultant current flow through divider wire 29 of the bridge circuit will not vary significantly. Similarly, other outside environmental forces that affect the impedance of either coil will have a substantially similar affect on both, such that the current flow through the divider wire will not be significantly varied.

If, however, a conductive material is positioned with respect to the sensing device or the sensing device is positioned with respect to the conductive material such that the collimated lines of flux are intercepted by the conductive material, current flow through the divider wire will change and the resultant differential reading at the read-out will be representative of the characteristics, i.e., the conductive nature of the material tested or the distance between the sensing head and the conductive material in accordance with the setting of switch unit 41a. If measurements are repeatedly made by placing the sensing head against conductive materials or a standard distance away from them, the read-out changes will be indicative of the conductivity of the material and, since various materials and grades of materials have different conductivities, classification of the materials subjected to testing is possible. As noted, the sensing device can also be used to measure distances from the device to a conductive material. Thus, by observing readings of the read-out device as a particular conductive material is moved into and out of proximity with the sensing device it is thereafter possible to determine the distance the material is located from the sensing device at any particular time.

It has been found that the magnetic housing 11 of the sensing device acts to direct the lines of flux generated by coil 12 toward and generally centrally through the membrane 15. When the housing 11 and brazed membrance 15 are subjected to sufficient heat for a sufficient period of time the central portion of the membrane appears to become even more non-magnetic and the periphery attached to the magnetic housing becomes somewhat magnetic, thereby focusing the lines of flux generated by coil 12 through the central portion of the membrane. The temperature required in heat treating the membrane 15 while in place on the end of housing 11, may vary with the thickness of the membrane, but it has been found that with a 5 mil membrane a temperature of 1,432° F. will suffice, if maintained for at least 10–20 minutes. Thereafter, slow cooling is required to prevent damage to the membrane. The heat treatment makes the central portion of the stainless steel membrane 15 less magnetic and the outer edge that is in contact with the housing 11 and that is closely adjacent to housing 11 becomes more magnetic, thus picking up the properties of the housing itself. When the non-ferrous, spaced apart shield members are affixed to the face of membrane 15, a narrow window is provided through which the lines of flux are further collimated. Thus, only the "window" is subjected to reflected impedance produced by the conductive specimen when the shield members are used.

Figure 5:
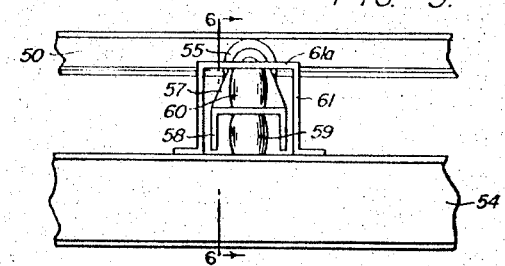
Figure 6:
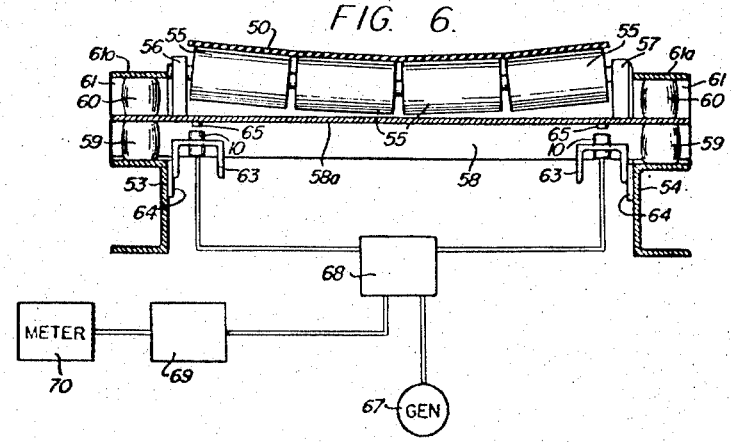

One principal use of the invention is shown in FIGS. 4–6, wherein a pair of the sensing devices of the invention are shown mounted as weighing devices.

As is shown fragmentarily, an endless conveyor belt 50 is conventionally supported throughout most of its load bearing length by conventionally mounted, spaced idler rollers 51. The idler rollers are supported between opposed posts 52 that stand on side rails 53 and 54 of the conveyor.

At one location along the load bearing length of the conveyor belt one of the conventionally mounted opposed idlers is replaced by an idler 55 that is supported between a pair of upright members 56 and 57. Members 56 and 57 do not rest directly on side rails 53 and 54, as do the posts 52, but instead are fixed to an inverted channel member 58, FIGS. 5 and 6, that extends from above side rail 53 to above side rail 54. The web 58a, at the ends of the channel member 58, rest on Vlier springs 59, i.e., barrel shaped members made of rubber, that are positioned on and anchored to the side rails.

Another Vlier spring 60 rests on the top of the web 58a above each spring 59 and these top springs are fitted tightly beneath the web 61a of an inverted hat section 61, the legs of which rest on the side rails.

The springs 60 have different spring rates than do the springs 59, so that no harmonic vibration will be maintained following compression of the springs due to a load on the conveyor passing thereover.

The downwardly extending legs of the channel 58 do not normally contact the side rails, but will do so to prevent damage to the sensing device of the invention, all as will be further described.

A pair of the sensing devices are shown, but it should be apparent that more could be used or that in some instances a single device may be satisfactory.

As illustrated, each sensing device 10 is mounted in a channel section 63 that is fixed to a plate section 64 attached to one of the side rails. The sensing devices and the channel sections in which they are mounted are positioned beneath the web of channel 58.

A button 65 of aluminum or similar highly conductive material is positioned on the underside of web 58, immediately above the end membrane 15 of each sensing device. The sensing devices 10 are each connected to a generator 67, through a circuit 68, shown schematically, but corresponding to the circuit 30 heretofore disclosed.

In practice, eddy current induced into the buttons 65 distort the magnetic fields set up in the sensing devices, thereby changing the electrical loading on the generator in an amount proportionate to the distance between the buttons and the sensing devices, which distance is a function of the load on the conveyor above the idler 55. Thus, the change in impedance of the loading of the generator, as detected by a demodulator 69 and displayed on a suitably calibrated read-out meter 70 is representative of the load passed thereover.

With the sensing devices of the invention an extremely accurate and substantially instantaneous reading can be obtained and this can be readily used for information or control purposes. Although the allowable travel distance of the button 65 is shown enlarged for purposes of clarity, in practice the buttons will move a maximum distance of only approximately 0.050 inches.

In utilizing the sensing devices of the invention in the weighing system heretofore described, care must be taken to prevent their being damaged. Thus, the springs 59 and 60 and the upright members 56 and 57 are designed and selected to deflect under maximum conveyor loading a very small distance. In addition the legs of the channel 58 are positioned to engage the side rails 53 and 54 just before contact is made between buttons 65 and the sensing devices 10. The channel member, therefore, provides a positive stop against further downward travel of the loaded conveyor.

Many other uses exist for the sensing devices of the invention. They can be used, for example, to determine the thickness of paint, oxides and other coatings on conductive materials by using a read-out device calibrated to provide a zero reading when the end membrane 15 is placed directly thereon and to provide a distance reading when placed on the coating material a spaced distance away from the material.

As has been previously noted, the sensing devices can also be used in the classification of conductive materials, with different readings being obtained on the read-out device for different materials and even for different grades of ferrous or non-ferrous metals. They also have utility in determining such things as the change in conductivity of conductive materials due to temperature humidity and pressure. By use of comparison arrangements wherein one sensing device is used in relationship to a standard speciman and one is used in relationship to a test speciman, changes in material characteristics can be readily determined. The sensing device can also be used to determine pressures applied directly to the membrane 15, to thereby cause a detectable deflection or by using it to sense the proximity of another conductive material moved in response to application of pressure thereagainst.

In many manufacturing operations the product can be moved past one or more of the sensing devices to determine whether or not flaws exist in the material or whether or not dimension tolerances have been met. Other uses will be apparent.

Although a preferred form of my invention has been herein disclosed, it is to be understood that the present disclosure is made by way of example and that variations are possible, without departing from the subject matter coming within the scope of the following claims, which subject matter I regard as my invention.

I claim:

1. A weighing device comprising
   a belt conveyor;
   rollers extending beneath and supporting said belt conveyor;
   supports for said rollers at opposite sides of the conveyor;
   vertically movable platform means carrying the supports for said rollers;
   a fixed support beneath the movable platform;
   a fixed member above the platform;
   spring means between the movable platform and the fixed support to resiliently separate the said movable platform and the fixed support;
   spring means between the movable platform and the fixed member above the platform to resiliently separate the movable platform and the fixed member above the platform, said spring means having a different spring rate that that of the spring means between the movable platform and the fixed support;
   a metallic member fixed to the bottom of the movable platform; and
   a sensing means spaced from said metallic member beneath said movable platform and arranged to have a flux output within which said metallic member moves upon movement of the movable platform and to supply a signal to an output meter indicative of the position of the metallic member as a function of load placed on the belt conveyor and passing over the said movable platform.

2. A weighing device as in claim 1, wherein the spring means are each Vlier springs.

3. A weighing device as in claim 1, further including rigid means fixed to the movable platform for engaging the fixed support before the metallic member can contact the sensing means.

4. A weighting device as in claim 1, wherein the sensing means includes a magnetic steel housing;

a first stainless steel membrane brazed to one end of the housing;

said housing and said first membrane having been heat treated together, such that central portions of a said membrane have become more non-magnetic and a peripheral portion has become more magnetic, whereby lines of flux are focused through said central portion;

an impedance circuit in said housing, said circuit including substantially identical measuring and reference coils forming legs of a bridge, the other legs of which are formed by the coils of an AC transformer, and wherein said reference and measuring coils are axially aligned within the housing such that the measuring coil is adjacent to the first membrane;

a second non-magnetic membrane stretched across the inside of the housing and dividing the housing substantially centrally thereof, said second membrane being spaced from the reference coil a distance corresponding to the distance the said first membrane is spaced from the said measuring coil;

a plug of insulating material substantially filling a portion of the housing at the side of the second membrane opposite said reference coil;

lead wires to said coils passing through said second membrane and said insulating plug, and being embedded in said plug;

cap means for securing said plug in place in said housing; and means, including said lead wires and said transformer, for translating differential impedance changes in the reference and measuring coils into a signal indicative of a sensed characteristic of a material crossing the lines of flux generated by the measuring coil and passing through the first membrane.

5. A weighing device as in claim 4, wherein the sensing means further includes means for further collimating lines of flux passed through the said first membrane, said means comprising at least one non-ferrous, metallic shield member overlying and covering all but a limited central portion of a face of the first membrane.

6. A weighing device as in claim 4, wherein the spring means are Vlier springs.

7. A weighing device of claim 6, further including rigid means fixed to the movable platform for engaging the fixed support before the magnetic member can contact the sensing means.

* * * * *